United States Patent [19]
Kawada et al.

[11] Patent Number: 5,373,333
[45] Date of Patent: Dec. 13, 1994

[54] PRESENTATION APPARATUS

[75] Inventors: Tadamichi Kawada, Urawa; Hiroshi Nakanishi, Sayama; Yukio Takahashi, Tokyo; Nobuhiro Funakoshi, Ibaragi, all of Japan

[73] Assignee: Nippon Telegraph and Telephone Corporation, Tokyo, Japan

[21] Appl. No.: 27,632

[22] Filed: Mar. 8, 1993

[30] Foreign Application Priority Data

Mar. 10, 1992 [JP] Japan .................................. 4-086158
Mar. 10, 1992 [JP] Japan .................................. 4-086160

[51] Int. Cl.$^5$ ..................... G02B 17/06; G03B 21/28
[52] U.S. Cl. ................................ 353/122; 359/630; 353/98
[58] Field of Search ............... 353/28, 122, 98, 99, 353/119, DIG. 3; 434/314, 315; 359/630, 631, 632

[56] References Cited

U.S. PATENT DOCUMENTS

| | | | |
|---|---|---|---|
| 3,547,522 | 12/1970 | Schaefer | 359/631 |
| 3,711,194 | 1/1973 | Wilson, Jr. | 353/DIG. 3 |
| 5,187,510 | 2/1993 | Vogeley et al. | 353/122 |
| 5,187,597 | 2/1993 | Kato et al. | 359/630 |
| 5,210,624 | 5/1993 | Matsumoto et al. | 359/630 |

Primary Examiner—William A. Cuchlinski, Jr.
Assistant Examiner—William C. Dowling
Attorney, Agent, or Firm—Pollock, VandeSande and Priddy

[57] ABSTRACT

An image of a text displayed on a flat display is reflected by a half mirror so that a speaker is allowed to see the reflected image in the direction in which he faces the audience. A document of the text to be displayed is prepared as character code data of a frame configuration, and a display controller controls the scroll or page updating of the display screen in accordance with a control instruction from a control panel.

7 Claims, 7 Drawing Sheets

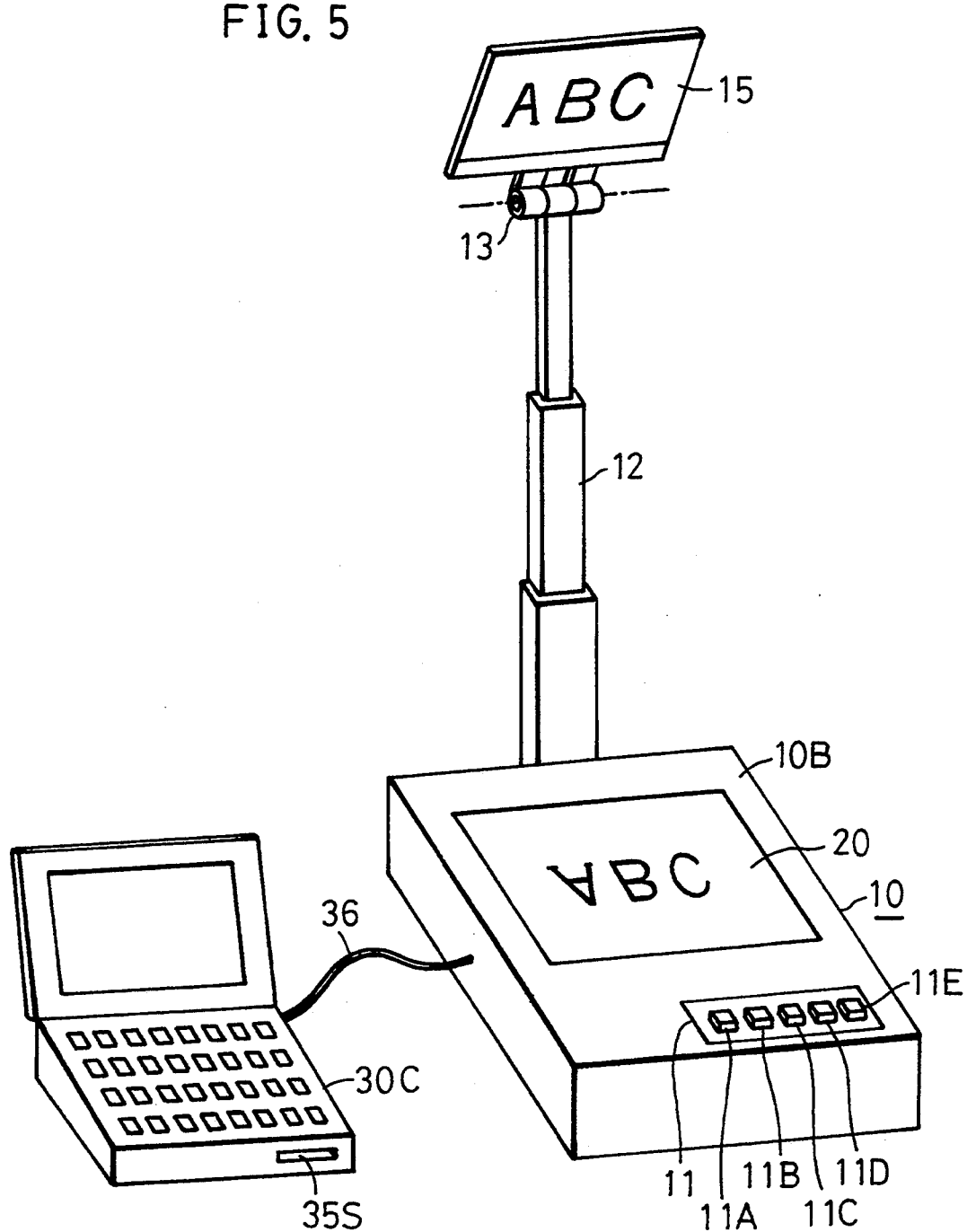

PRESENTATION APPARATUS

BACKGROUND OF THE INVENTION

The present invention relates to a presentation apparatus, commonly referred to as a prompter, which allows a speaker to look at notes while at the same time presenting a lecture, for example.

Conventionally, when a lecture or speech is so long that the speaker cannot memorize all of its contents, he usually speaks referring to a prepared text, gists, keywords, drawings, etc. (hereinafter referred to simply as a prepared text) placed on a lecture table. In such an instance, the speaker cannot always keep eye contact with the audience which is said to be most important in the speech, and hence he inevitably fails to attract the audience. When such a text is not prepared, the speaker may sometimes forget to tell necessary information or fail to make a correct report.

As a solution to this problem, there has been proposed an apparatus of the type wherein a CRT or similar display unit is disposed near the lecture table at a position unseen from the audience and a text on the display screen of the CRT is reflected by a half mirror disposed across the line of sight joining the speaker and the audience so that the speaker is allowed to look at the reflected image of the text and the audience in the same direction. With such an apparatus, the speaker is capable of running his eyes over the text while at the same time keeping eye contact with the audience. In the case of actually employing such a conventional apparatus, the text that is to be displayed on the display unit is written on a continuous sheet of paper in advance, the continuous sheet is wound around a paper feeder and an image of the text captured by a video camera on a pagewise basis is displayed on the CRT during the speech. Accordingly, the speaker or his assistant needs to repeat pausing the paper feeder upon each display of a desired page of the text and driving the paper feeder to proceed to the next page upon completion of the desired one. Moreover, he may sometimes need to search for a desired page by rewinding or fast forwarding the text through manipulation of the paper feeder. It is not easy for him, however, to repeat actuating and pausing the paper feeder in search of the desired image while speaking to the audience. In addition, the text must be prepared in a form that permits its image capturing by the video camera, and it is not easy to correct, modify and edit the text once it has been prepared.

SUMMARY OF THE INVENTION

It is therefore a first object of the present invention to provide a presentation apparatus which allows the speaker to look at a displayed text while keeping eye contact with the audience and facilitates controlling the page migration of the displayed text.

A second object of the present invention is to provide a presentation apparatus which facilitates the preparation, correction and edition of the text for display.

The presentation apparatus according to the present invention includes: an upright bar adjustable in height; a half mirror mounted on the top of the bar in a manner to be pivotal about a horizontal axis; text data storage means for storing text data including character code data; display control means for converting the text data read out of the text data storage means to an image signal and for outputting it; flat display means for displaying the image of the text on the basis of the image signal from the display control means; and actuating means for furnishing the display control means with an instruction for updating the display image on the display means. The half mirror receives the display image from the flat display means and reflects the display image of a reduced quantity of light toward the speaker, allowing him to look at the display image of the text and the audience in the same direction.

BRIEF DESCRIPTION OF THE DRAWINGS

FIG. 5 is a perspective view of an embodiment of the present invention which utilizes a laptop computer which is separately provided as the display control section 30 in FIG. 1;

DESCRIPTION OF THE PREFERRED EMBODIMENTS

Figure 1:
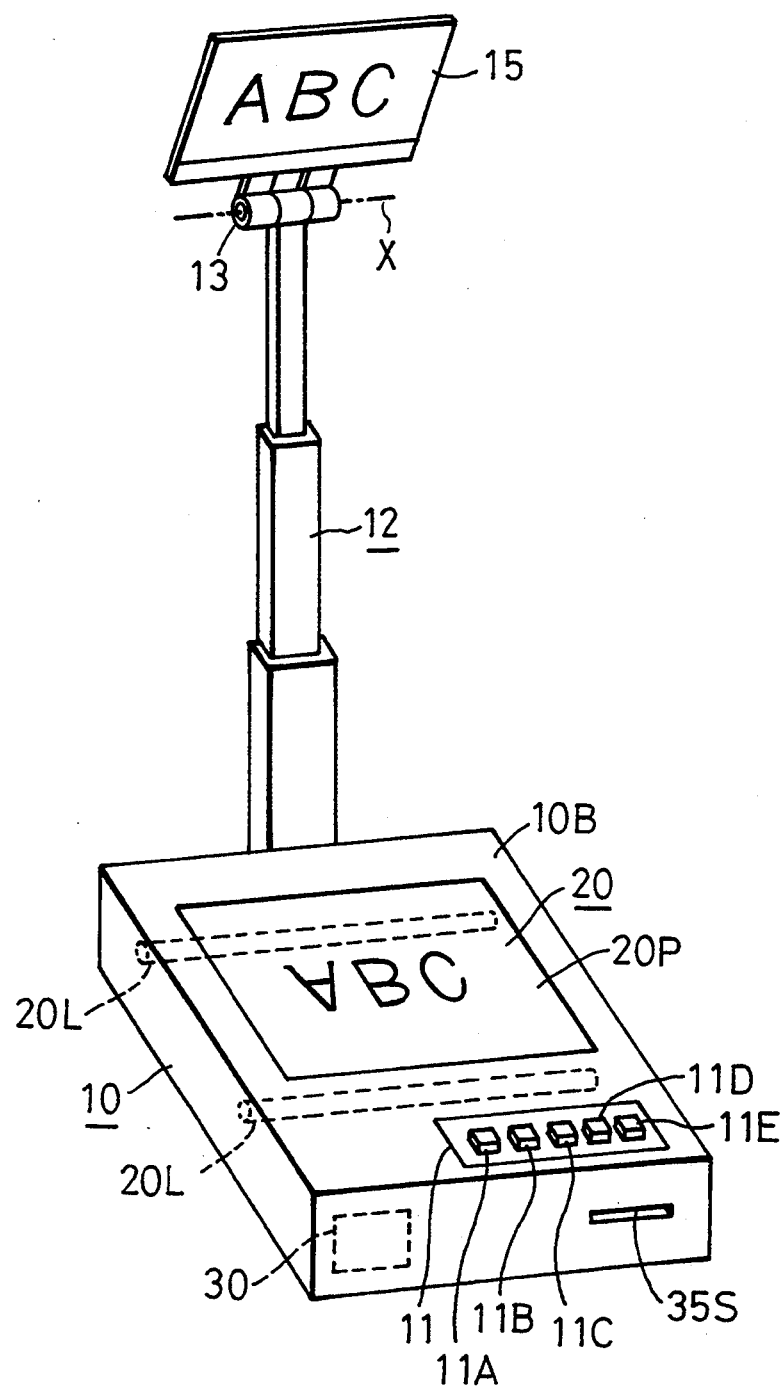
FIG. 1 is a perspective view illustrating a portable presentation apparatus according to the present invention.

FIG. 1 is a perspective view illustrating a first embodiment of the presentation apparatus according to the present invention. Shown in FIG. 1 is the case of a portable prompter, which is made up of a thin box-like body 10 to be placed on a lecture table, an upright bar 12 which is detachably mounted on the rear side wall of the body 10 and is adjustable in height, and a half mirror 15 pivotally secured to a hinge 13 mounted on the top of the bar 12. On the top of the box-shaped body 10 there is provided, in this example, a display panel 20P of a flat display 20 for displaying a text. By positioning the half mirror 15 at an optimum height through adjustment of the height of the upright bar 12 and by turning the half mirror 15 about the horizontal axis X to an optimum angle, a reflected image of the text displayed on the display 20 can be formed in the direction of the line of sight in which the speaker faces the audience. The flat display 20 may be a plasma, EL, liquid crystal or similar display. In the case of using the liquid crystal display, back lights 20L are provided in the box-shaped body 10, as indicated by the broken lines in FIG. 1, for illuminating the liquid crystal display panel 20P from behind.

On the top of the box-shaped body 10 there is further provided a control panel 11, on which are arranged keys 11A and 11B for controlling the scroll speed of the screen of the display 20, a key 11C for controlling the start and stop of the scroll and keys 11D and 11E for updating the display screen with the next page and the preceding page, respectively.

Figure 2:
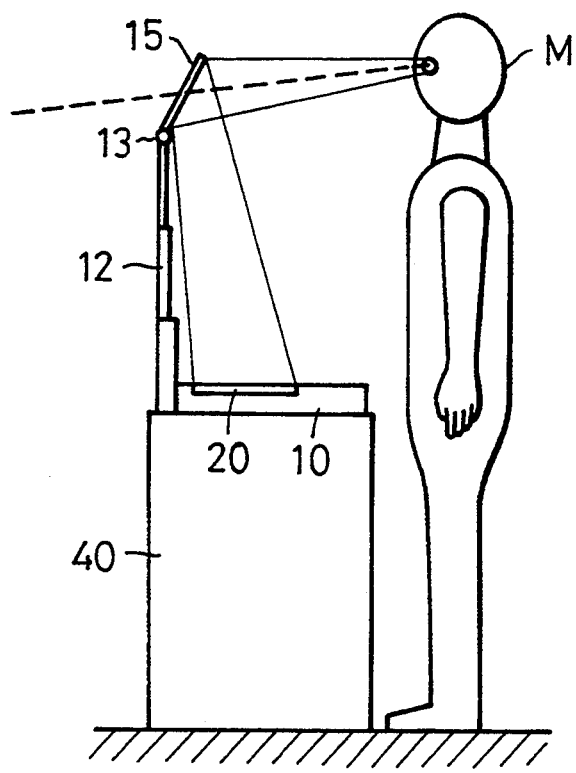
FIG. 2 is a side view showing the manner in which the presentation apparatus depicted in FIG. 1 is actually used.

The prompter depicted in FIG. 1 is mounted on, for example, a lecture table 40 as shown in FIG. 2. In this case, the speaker M is capable of looking at the displayed text image on the display 20 reflected by the half mirror 15 while keeping eye contact with the audience within the range of the half mirror 15 and its vicinity.

Figure 3:
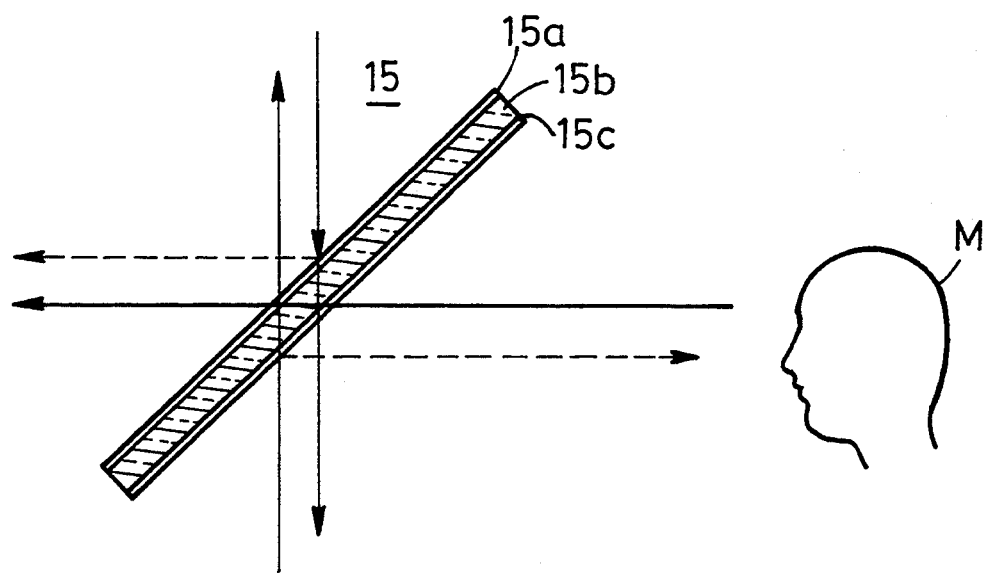
FIG. 3 is a sectional view of a half mirror 15 for use in the presentation apparatus.

As shown in FIG. 3, the half mirror 15b has an anti-reflection coating 15a formed all over the surface of, for instance, a sheet of glass or transparent plastic 15b on the side facing the audience and a half mirror coating 15c deposited all over the other side facing the speaker. The anti-reflection coating 15a reduces the quantity of light by the illumination of the room or hall which is reflected toward the audience. The reflectivity of the half mirror coating 15c is as low as several percent, but by using a liquid crystal display as the display 20 and raising the luminance of the back lights 20L to, for example, 15000 nt, the luminance of the reflected image by the half mirror 15 is increased to about 100 nt despite the attenuation of the quantity of light by the liquid crystal display panel 20P—this luminance of the reflected image is sufficient for the speaker under normal illumination of the room. When ordinary plate glass is used as the transparent sheet 15b, its reflectivity is several percent, and hence the half mirror coating 15c need not be provided that is, the plate glass 15b functions fully as the half mirror 15.

Figure 4:
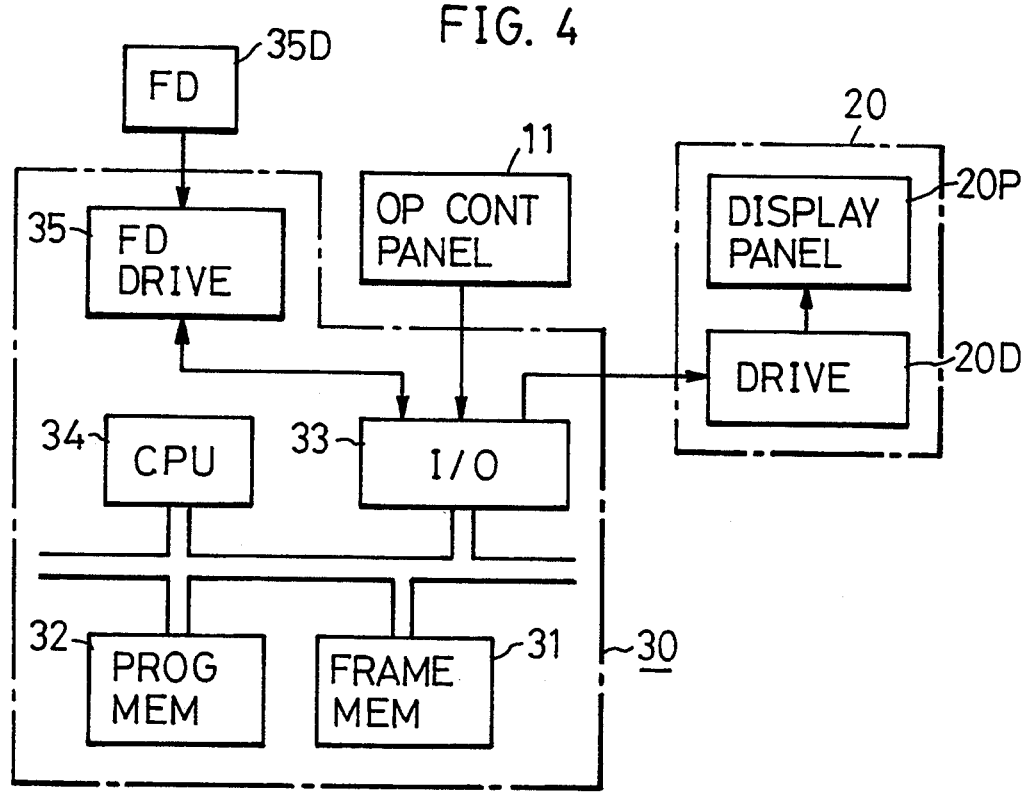
FIG. 4 is a block diagram illustrating the construction of a display control section 30 in the presentation apparatus shown in FIG. 1.

In the box-shaped body 10 there is provided a display controller 30. As shown in FIG. 4, the display controller 30 is composed of: a frame memory 31 for storing the text in the form of a frame for each page as character codes or a combination of character codes and images; a program memory 32 for converting the character codes read out of the memory 31 to a bit map pattern of a desired size, for controlling the scroll and page migration of the display screen and for controlling the drive of the display 20; and a CPU 34 which responds to an instruction from the control panel 11 via an I/O interface 33 to process the stored data of the frame memory 31 in accordance with a program of the program memory 32 to generate image signals. Since such a configuration is well-known, no detailed description will be given thereof.

The text of a document and/or graphic form is prepared as character code data and/or image data by use of a personal computer or word processor, for example, and the data is prestored on a data storage medium such as a floppy disk, magneto-optic disk, or RAM card (hereinafter explanation will be given of the case using a floppy disk) 35D. By inserting the floppy disk 35D into a slot 35S (FIG. 1) when the presentation apparatus is used, a FD driver 35 reads out the text data from the floppy disk 35D in accordance with an instruction from the CPU 34 and provides it to the frame memory 31 via the I/O interface 33.

In the case where the speaker sees the image of the text once reflected by the half mirror 15, it is necessary that a mirror image (i.e. a reverse image) of a normal image be displayed on the display 20 as depicted in FIG. 1. This requirement can be met by an arrangement wherein when generating the bit map pattern in accordance with the character codes read out of the memory 31, the CPU 34 reverses the mirror image of the pattern in accordance with a reversal processing program set in the memory 32 (and reverses the image read out of the memory 31 as well) or by an arrangement wherein the display panel 20P forming the liquid crystal display 20, for instance, is mounted upside down on the box-shaped body 10. In the case of the former, since the image reversal processing by the CPU 34 is needed, the scroll speed of the displayed text image and the page updating speed decrease, moreover the program memory 32 needs to have a capacity large enough to store the program for the image reversal processing as well. On the other hand, in the case of the latter, since the quantity of data that is processed by the CPU 34 is small, the page updating of the displayed text image and scroll control of the screen can be achieved at high speed and the capacity of the memory 32 may be small.

FIG. 5 illustrates a modified form of the FIG. 1 embodiment, wherein the display controller 30 built in the box-shaped body 10 is removed and instead, for instance, a laptop personal computer 30C is connected to the body 10 via a cable 36. As is well-known, the personal computer 30C has incorporated therein the function of the display controller 30 depicted in FIG. 4. When depressing the keys 11A to 11E of the control panel 11, instruction codes are provided via the cable 36 to the I/O interface 33 in the personal computer 30C and the CPU 34 responds to the instruction codes to update the display screen and control its scroll. This embodiment permits the preparation and edition of the text on the personal computer 30C. Moreover, the text thus prepared can also be retained, if necessary, on the floppy disk inserted into the slot 35S.

Figure 6:
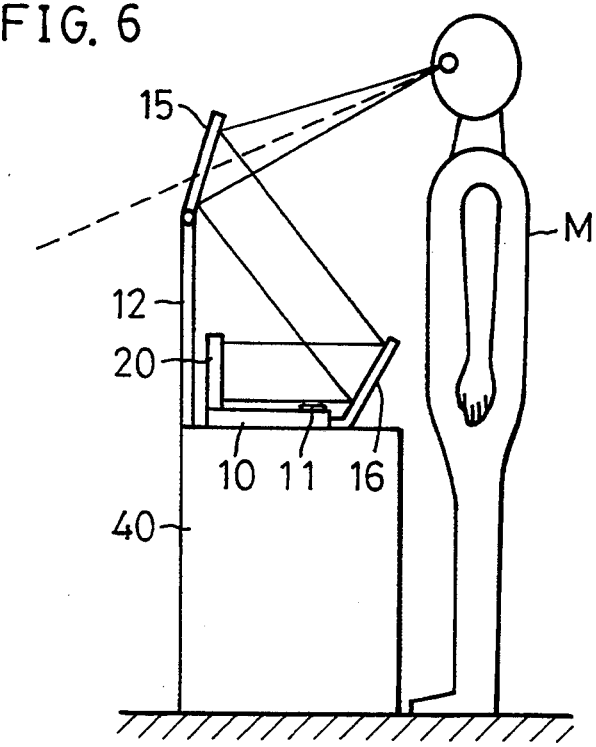
FIG. 6 is a side view illustrating another embodiment of the presentation apparatus constructed so that the display image is reflected twice.

FIG. 6 illustrates another embodiment of the present invention. On the lecture table 40 there is mounted the presentation apparatus of this embodiment wherein the flat display 20 is disposed substantially vertically along the rear wall of the box-shaped body 10 and a mirror 16 is extended aslant from the front wall of the body 10 in opposing relation to the display screen of the display 20. The image of the text displayed on the display 20 reaches the eyes of the speaker M after being reflected by the mirror 16 and further reflected by the half mirror 15. Consequently, in this case, the speaker M can see, in the half mirror 15, the same image as that displayed on the display 20, and hence the display 20 needs only to display the non-inverted normal image. In this embodiment the body 10 including the display controller 30 (not shown) and the display 20 may be formed by the laptop personal computer itself. In such an instance, the various keys of the control panel 11 can be made to correspond with predetermined plural keys on the keyboard of the personal computer. Of course, the body 10 including the display controller 30 and the display 20 may also be discrete units, in which case they may also be installed on the lecture table 40.

Figure 7:
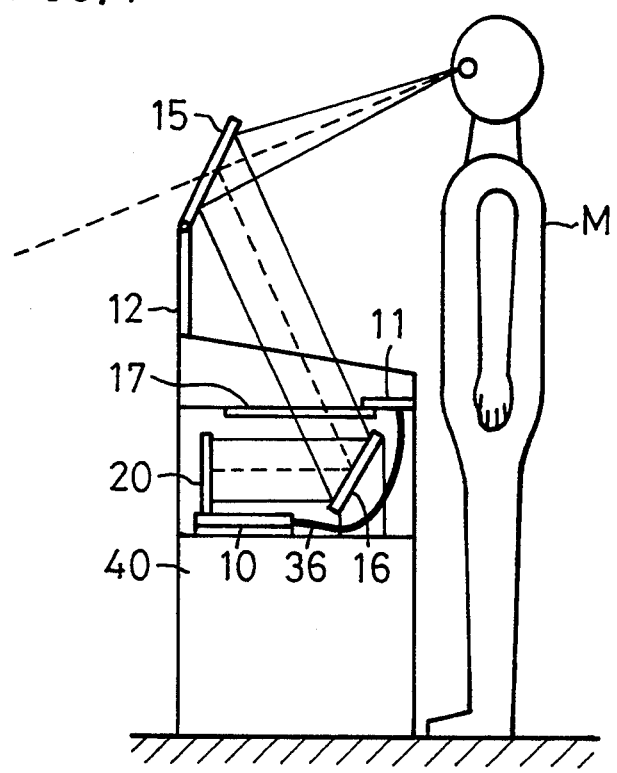
FIG. 7 is a side view of the double reflection type presentation apparatus fixed to a lecture table.

FIG. 7 illustrates another embodiment of the present invention, which is the double reflection type as is the case with the FIG. 6 embodiment, and the prompter is fixed to the lecture table 40. The upright bar 12, which supports the half mirror 15, is fixedly mounted on the lecture table 40 and the box-shaped body 10 having built therein the display controller 30 (not shown) is also fixedly mounted on the lecture table 40. The flat display 20 is disposed vertically on the rear panel of the body 10 and the mirror 16 is mounted on the front panel of the body 10 in opposing relation to the display screen of the display 20. A transparent table 17 as of glass or plastic material is provided above the body 10, the display 20 and the mirror 16. The display image of the text, reflected by the mirror 16, is incident to the half mirror 15 through the transparent table 17. In this embodiment the control panel 11 is disposed on the transparent table 17 along its front marginal portion and is connected by the cable 36 to the body 10.

Figure 8:
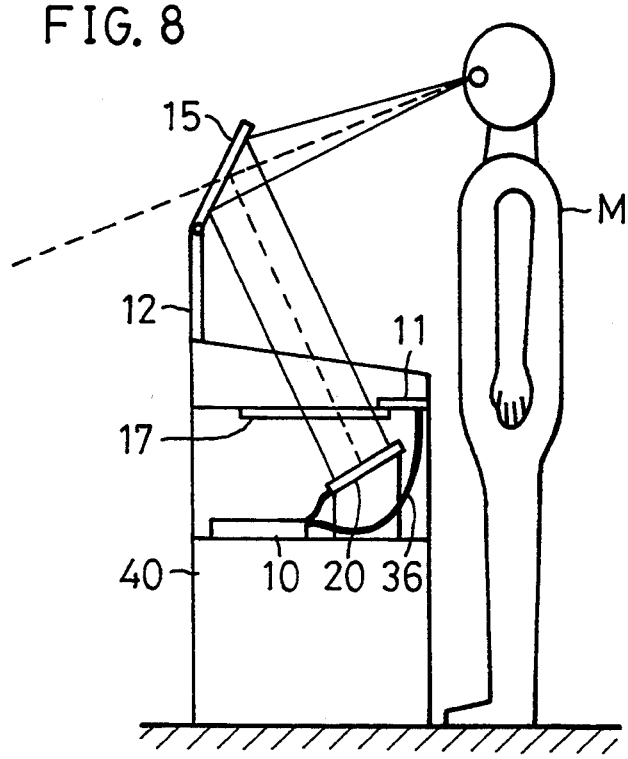
FIG. 8 is a side view of the single reflection type presentation apparatus fixed to a lecture table.

FIG. 8 illustrates a modified form of the FIG. 7 embodiment in which the prompter is fixed to the lecture table. In this embodiment, the mirror 16 is not used but instead the display image of the text from the display 20 is incident to the half mirror 15 through the transparent table 17, and hence a reverse image of the text must be displayed on the display 20.

Figure 9:
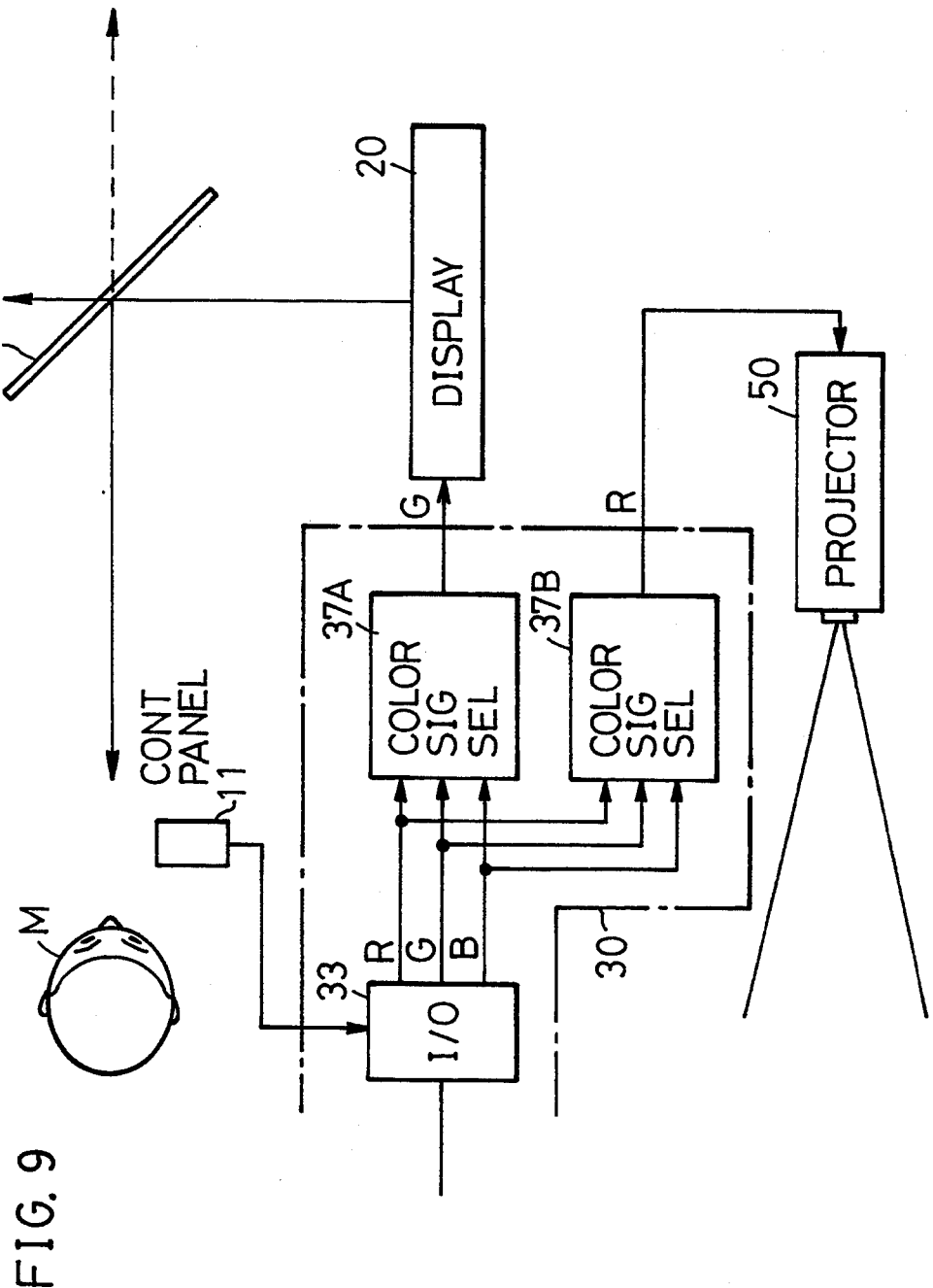
FIG. 9 is a simplified block diagram illustrating another embodiment of the presentation apparatus which is equipped with a projector.

Incidentally, a projector is often used to facilitate a better understanding of the contents of a lecture. In such an instance, it would be desirable that the speaker M could see the text corresponding to an image projected onto the screen for the audience. FIG. 9 shows, in a simplified form, an embodiment of a presentation apparatus which is a combination of the prompter according to any one of the embodiments described above and an electronic projector 50 such as a liquid crystal overhead projector. In FIG. 9 the prompter is shown by only part thereof including the half mirror 15, a part of the display controller 30 and the flat display 20. In this embodiment each frame of an image for projection and the corresponding text for the prompter are formed in the same frame as image information of two colors selected from red, green and blue colors. The display controller 30 includes two color signal select circuits 37A and 37B in addition to the elements shown in FIG. 4, and these circuits are supplied with R, G and B image signals from the I/O interface 33.

In the case where the text for the prompter is prepared using character codes of green, for example, the color select circuit 37A is set to select a green color image signal, which is provided to a driver (not shown) of the display 20. Based on the green color image signal, the display 20 displays the text as a single-color (or black-and-white) image. On the other hand, if the color signal select circuit 37B is set to select a color image signal (a red color image signal, for example) corresponding to the color assigned to the image for projection, the red color image signal thus selected is applied to a driver (not shown) of projector 50. It is also possible to select the remaining blue color signal by the two color signal select circuits 37A and 37B in common to them, as required, so that common image information can be displayed on the display 20 and the projector 50 in combination with the individual images. In such a case, the display 20 and the projector 50 are adapted to provide color displays to display the common image in a color different from those of the individual images. With such an arrangement, when a key of the control panel 11 of the prompter (or key of the personal computer 30C) is pressed to scroll the screen of the projector or update the page, the display image of the text on the prompter is also automatically scrolled or page-updated.

Figure 10:
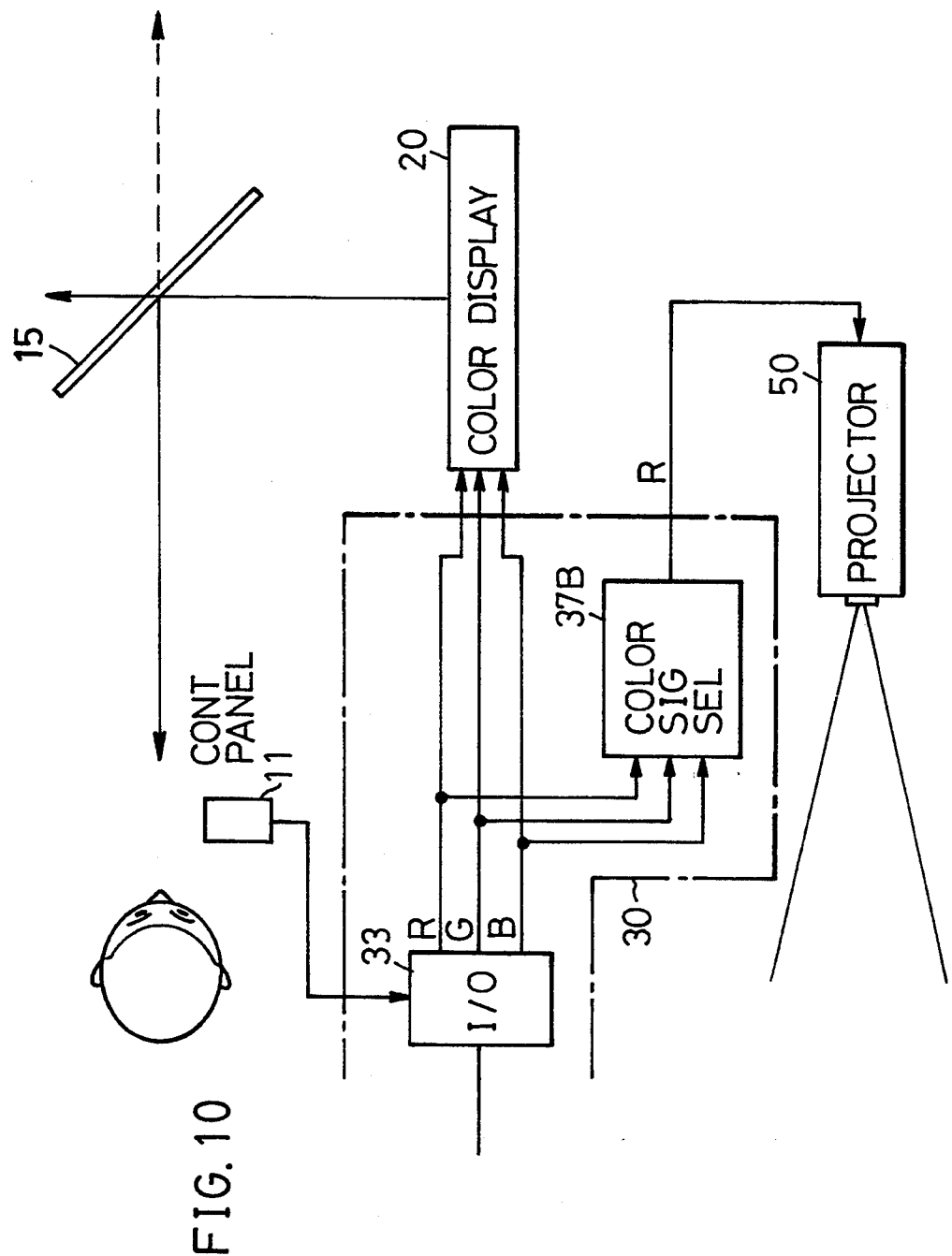
FIG. 10 is a simplified block diagram illustrating another embodiment of the presentation apparatus which is equipped with the projector.

FIG. 10 illustrates a modification of the FIG. 9 embodiment, wherein three color signals are provided directly to the display 20 of the prompter. By displaying the image of the text for the prompter and the image for projector on the same display 20 in different colors, the speaker M is allowed to speak from the text while at the same time confirming the same image as that shown by the projector 50 to the audience.

As described above, according to the present invention, the image of the text display on the flat display 20 is reflected onto the half mirror 15 so that the speaker may see the reflected image in the direction in which he faces the audience. Since the document to be displayed is prepared as character code data of a frame configuration by a personal computer or word processor, it can easily be corrected or edited, and in response to a control instruction from the control panel 11, the text being displayed can easily be updated or scrolled frame by frame corresponding to the page being displayed.

It will be apparent that many modifications and variations may be effected without departing from the scope of the novel concepts of the present invention.

What is claimed is:

1. A presentation apparatus comprising:
   an upright bar adjustable in height;
   a half mirror mounted on said upright bar in a manner to be turnable about a horizontal axis;
   text data storage means for storing text data of a frame configuration, including at least text document as character code data;
   display control means for converting said text data of a specified frame, read out of said text data storage means, to an image signal and for outputting said image signal;
   a box-shaped body;
   flat display means mounted on said box shaped body for displaying an image on the basis of said image signal, said half mirror receiving said display image from said flat display means and reflecting a portion of the quantity of light incident thereto;
   control means mounted on said box-shaped body for providing a frame control instruction for said display image to said display control means; and
   said display control means including a laptop computer connected by a cable to said flat display means on said box-shaped body, said frame control instruction being provided from said control means to said laptop computer via said cable.

2. The presentation apparatus of claim 1 wherein said display control means includes: frame memory means wherein said text data read out of said text data storage means is stored in the form of a frame, program memory means which has stored therein 5 frame control processing program for said text data; and a CPU which responds to said frame control instruction from said control means to process said text data stored in said frame memory means on the basis of a data processing program in said program memory means, thereby generating said image signal.

3. The presentation apparatus of claim 1 wherein said half mirror has a half mirror coating on the side from which said display image is reflected and an anti-reflection film on the other side.

4. The presentation apparatus of claim 1 wherein said text data storage means is a floppy disk.

5. A presentation apparatus comprising:
   an upright bar adjustable in height;
   a half mirror mounted on said upright bar in a manner to be turnable about a horizontal axis;
   text data storage means for storing text data of a frame configuration, including at least text document as character code data;
   display control means for converting said text data of a specified frame, read out of said text data storage means, to an image signal and for outputting said image signal;
   flat display means for displaying an image on the basis of said image signal from said display control means, said half mirror receiving said display image from said flat display means and reflecting a portion of the quantity of light incident thereto;

control means for providing a frame control instruction for said display image to said display control means;

said display control means including frame memory means wherein said text data read out of said text data storage means is stored in the form of a frame, program memory means which has stored therein a frame control processing program for said text data, and a CPU which responds to said frame control instruction from said control means to process said text data stored in said frame memory means on the basis of a data processing program in said program memory means, thereby to generate an image signal composed of at least two different color signals;

electronic projector means for projecting an image onto a screen;

said text data to be displayed on said flat display means and image data to be displayed by said projector means being produced in the same frame as data of at least two different primary colors preselected from three primary colors; and said display control means including first color signal select means supplied with a plurality of color signals for selecting therefrom a color signal corresponding to said text data and providing said selected color signal to said flat display means, and second color select means supplied with said plurality of color signals for selecting therefrom a color signal corresponding to said image data and providing said selected color signal to said projector means.

6. The presentation apparatus of claim 5 wherein said flat display means and said projector means are to provide color display in accordance with color signals provided thereto, each frame contains, as data of another primary color, information data to be displayed in common by both said flat display means and said projector means, and said first and second color select are operative to select a color signal corresponding to said common information data and provide said selected color signal to said flat display means and said projector means, respectively.

7. A presentation apparatus comprising:

an upright bar adjustable in height;

a half mirror mounted on said upright bar in a manner to be turnable about a horizontal axis;

text data storage means for storing text data of a frame configuration, including at least text document as character code data;

display control means for converting said text data of a specified frame, read out of said text data storage means, to an image signal and for outputting said image signal;

flat display means for displaying an image on the basis of said image signal from said display control means, said half mirror receiving said display image from said flat display means and reflecting a portion of the quantity of light incident thereto;

control means for providing a frame control instruction for said display image to said display control means;

said display control means including frame memory means wherein said text data read out of said text data storage means is stored in the form of a frame, program memory means which has stored therein a frame control processing program for said text data, and a CPU which responds to said frame control instruction from said control means to process said text data stored in said frame memory means on the basis of a data processing program in said program memory means, thereby to generate an image signal composed of at least two different color signals;

said flat display means being operative to provide color displays in accordance with a plurality of color signals applied thereto, said plurality of color signals containing a color signal corresponding to said text data;

electronic projector means for projecting an image onto a screen;

said text data to be displayed on said flat display means and image data to be displayed by said projector means being produced in the same frame as pieces of data of at least two different primary colors preselected from three primary colors; and said display control means including color signal select means which is supplied with said plurality of color signals for selecting therefrom a color signal corresponding to said image data and providing said selected color signal to said projector means.

* * * * *